United States Patent
Kapaan et al.

(10) Patent No.: US 6,367,592 B1
(45) Date of Patent: Apr. 9, 2002

(54) MODULAR ACTUATOR, AND BRAKE CALIPER COMPRISING SUCH ACTUATOR

(75) Inventors: Hendrikus Jan Kapaan; Jacobus Zwarts, both of Nieuwegein; Andries Christian Rinsma, Leeuwarden, all of (NL); Johannes Albertus Van Winden, Heidelberg (DE); Clair Druet, Drumettaz Clarafond (FR); Alexander Jan Carel De Vries, Tiel (NL); Armin Herbert Emil August Olschewski, Schweinfurt; Thomas Wilhelm Fucks, Aachen, both of (DE)

(73) Assignee: SKF Engineering and Research Centre B.V., Nieuwegein (NL)

(*) Notice: Subject to any disclaimer, the term of this patent is extended or adjusted under 35 U.S.C. 154(b) by 0 days.

(21) Appl. No.: 09/600,419
(22) PCT Filed: Jan. 20, 1998
(86) PCT No.: PCT/NL98/00033
  § 371 Date: Oct. 24, 2000
  § 102(e) Date: Oct. 24, 2000
(87) PCT Pub. No.: WO99/37010
  PCT Pub. Date: Jul. 22, 1999
(51) Int. Cl.[7] .................. H02K 7/06; F16H 25/20; F16D 65/16; F16D 55/16
(52) U.S. Cl. ............. 188/72.1; 74/89.15; 74/424.8 R; 188/158; 188/162; 188/72.8; 303/20
(58) Field of Search ............. 188/72.1, 156, 188/158, 162, 72.8, 71.8, 157, 1.11 ALL, 72.6, 161, 163; 74/89.15, 424.8 R, 89.17, 89.23; 310/83, 80; 303/20, 115.2; 318/372

(56) References Cited

U.S. PATENT DOCUMENTS

| | | |
|---|---|---|
| 2,988,609 A | 6/1961 | Evans, Jr. |
| 4,579,012 A | 4/1986 | Mabie et al. |
| 4,685,345 A | 8/1987 | Gruss |
| 4,712,441 A | 12/1987 | Abraham |
| 4,804,073 A | 2/1989 | Taig et al. |
| 4,836,338 A | * 6/1989 | Taig ............ 188/72.1 |
| 4,867,000 A | 9/1989 | Lentz |
| 4,877,113 A | * 10/1989 | Taig ............ 188/72.1 |
| 5,067,826 A | 11/1991 | Lemelson |
| 5,107,967 A | 4/1992 | Fujita et al. |
| 5,829,557 A | * 11/1998 | Halasy-Wimmer et al. . 188/162 |
| 5,971,110 A | * 10/1999 | Martin ............ 188/72.1 |
| 6,158,558 A | * 12/2000 | Bill et al. ............ 188/162 |

FOREIGN PATENT DOCUMENTS

| | | | |
|---|---|---|---|
| GB | 2 201 655 A | | 9/1988 |
| WO | 96/03301 | | 2/1996 |
| WO | 97/11287 | | 3/1997 |
| WO | 9902883 | * | 1/1999 |
| WO | 9902884 | * | 1/1999 |
| WO | 9921266 | * | 4/1999 |
| WO | 9937010 | * | 7/1999 |

* cited by examiner

Primary Examiner—Douglas C. Butler
(74) Attorney, Agent, or Firm—Oliff & Berridge PLC

(57) ABSTRACT

An actuator for use in a brake caliper is situated at opposite ends of a screw mechanism. A reduction gear mechanism is located at a distance from the actuating member. The reduction gear mechanism is included in a reduction gear module and a screw mechanism is contained in a screw mechanism module, which are interconnected through a drive module. The drive module may be located at the end of the reduction gear module facing away from the screw mechanism module. The modules may be axially aligned or at least two modules may be axially shifted or eccentric with respect to each other. The screw mechanism module may comprise an angular contact bearing which may be supported in a housing in different ways. The reduction gear module may be part of a planetary gear system.

28 Claims, 2 Drawing Sheets

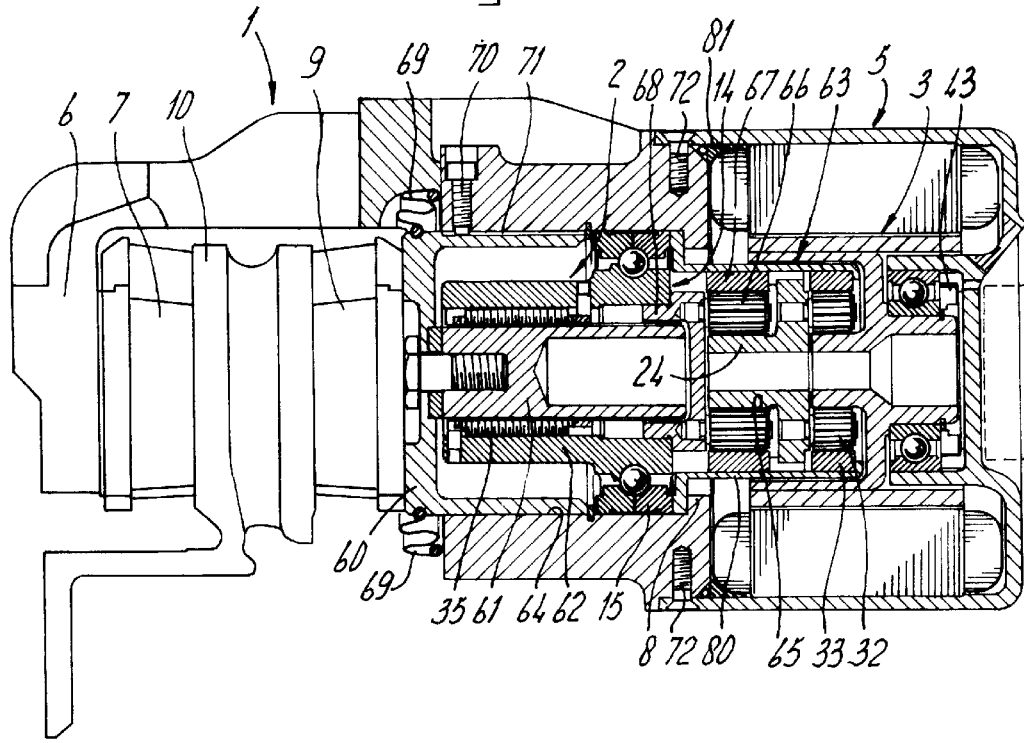
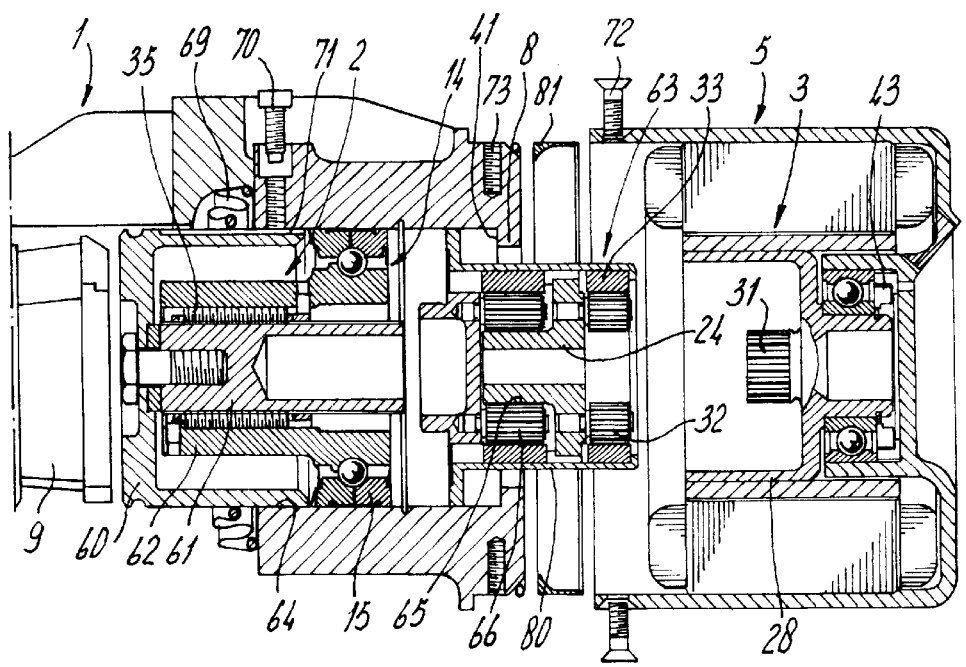

MODULAR ACTUATOR, AND BRAKE CALIPER COMPRISING SUCH ACTUATOR

The invention is related to an actuator, comprising a housing, a motor, an actuating member and a screw mechanism providing a linear movement of the actuating member with respect to the housing in response to a rotational movement of the motor, which screw mechanism comprises a screw and a nut one of which is rotatably supported with respect to the housing by means of an angular bearing, and a reduction gear means.

Such actuator is known from WO-A-9603301. Said known actuator, which is a part of an electrically actuatable brake calliper for a disc brake, comprises a roller screw mechanism and a satellite gear wheel mechanism. The screw mechanism is accommodated partly within an electric motor. The end of said screw mechanism which protrudes from the electric motor towards the brake pads, carries an integrated thrust bearing as well as an integrated satellite gear wheel mechanism.

The satellite gear wheel system is positioned around the screw mechanism. This position leads to rather big radial dimensions of the satellite gear wheel system, whereby the stiffness of said system is reduced and the operational deflections are increased. Thus, the required transmission stiffness cannot be maintained. Moreover, as a result of this layout, this known actuator is rather complicated and therefore rather cumbersome with respect to manufacturing.

A further drawback of the complicated integrated structure of the prior art actuator is related to the area of manufacturing. Usually, manufacturing of rolling mechanisms such as the rolling bearing and the screw mechanism require a different background than manufacturing gear systems. As these components are integrated to a considerable degree in the prior art actuator, problems may arise as to the proper selection of combined required different manufacturing technologies and the proper control of these manufacturing processes.

The object of the invention is therefore to provide an actuator which does not have these disadvantages. This object is achieved in that the actuating member and the reduction gear means are situated at opposite ends of the screw mechanism.

In the actuator according to the invention, the reduction gear means is at a different position than the screw mechanism, which has several advantages. For instance, such position is less subject to space constraints. Furthermore, the reduction gear means is at a distance from the actuating member, which allows more space and freedom of design for those components.

According to a further important advantage of the invention, the actuator can now be carried out in such a way that the reduction gear means is contained in a reduction gear module and the screw mechanism is contained in a screw mechanism module. According to a preferred embodiment said reduction gear module and screw mechanism module are interconnected through a drive module.

The drive module may be at the end of the reduction gear module facing away from the screw mechanism module.

The modular layout of the several components which make up the drive line of the actuator, enables the application of dedicated required manufacturing technologies and processes for each individual component of the entire system. Also, the modular design opens ways for parallel production of components, leading to a more streamlined and cost effective production process.

Nevertheless, after manufacturing the said components in this way, they may be united in pre-assembled sub-units. For instance, the reduction gear module and the screw mechanism modular are integrated, or the screw mechanism module and the drive module are integrated.

The layout of the several modules may be designed such that at least two modules are axially aligned, or that at least two modules are axially shifted or excentric with respect to each other.

In order to better accommodate the loadings on the actuating member, the screw mechanism module may comprise an angular contact bearing.

Said bearing may be supported within the housing in different ways. According to a first possibility, the outer ring of the angular contact bearing rests against the radial surface of the inwardly protruding flange facing away from the brake pads, said outer ring and flange being held against each other by means of bolts under tension.

According to a second possibility, the outer ring of the angular contact bearing rests against a radial surface of the inwardly protruding flange which faces towards the brake pads. In this embodiment, the outer ring is pressed firmly onto said flange under the influence of the actuating forces, which means that such construction can do without highly loaded bolts.

The reduction gear module may comprise at least part of a planetary gear system having a stationary outer ring gear with inwardly pointing gear teeth. In particular, the reduction gear module may comprise satellite gear wheels which mesh with the ring gear and which are accommodated on a carrier connected to a rotary shaft engaging the screw mechanism, and the sunwheel of the planetary gear system may be accommodated on a drive shaft of the drive module.

Furthermore, a sensor may be provided for detecting rotational and/or translational movements of the screw mechanism. Also, control means may be provided, said control means having an input for a control signal, e.g. from a brake pedal, and being connected to the sensor for controlling the electric motor on the basis of the control signal and the signal from the sensor. The sensor is in particular suitable for obtaining force feedback, wear compensation and/or maintenance indication.

The actuator according to the invention can be applied for different purposes. In particular, the actuator is suitable for use in a brake calliper for an electrically actuatable disc brake, said calliper comprising an actuator as described before, and a claw piece carrying two opposite brake pads, said actuator comprising a screw and a nut one of which is rotatably supported with respect to the housing by means of an angular bearing, and a reduction gear means.

The invention will now be described further with reference to several embodiments of brake calipers, containing an actuator according to the invention.

FIG. 1 shows a first embodiment of a brake calliper,

FIG. 2 shows a brake calliper according to FIG. 1 in exploded view,

Figure 3:
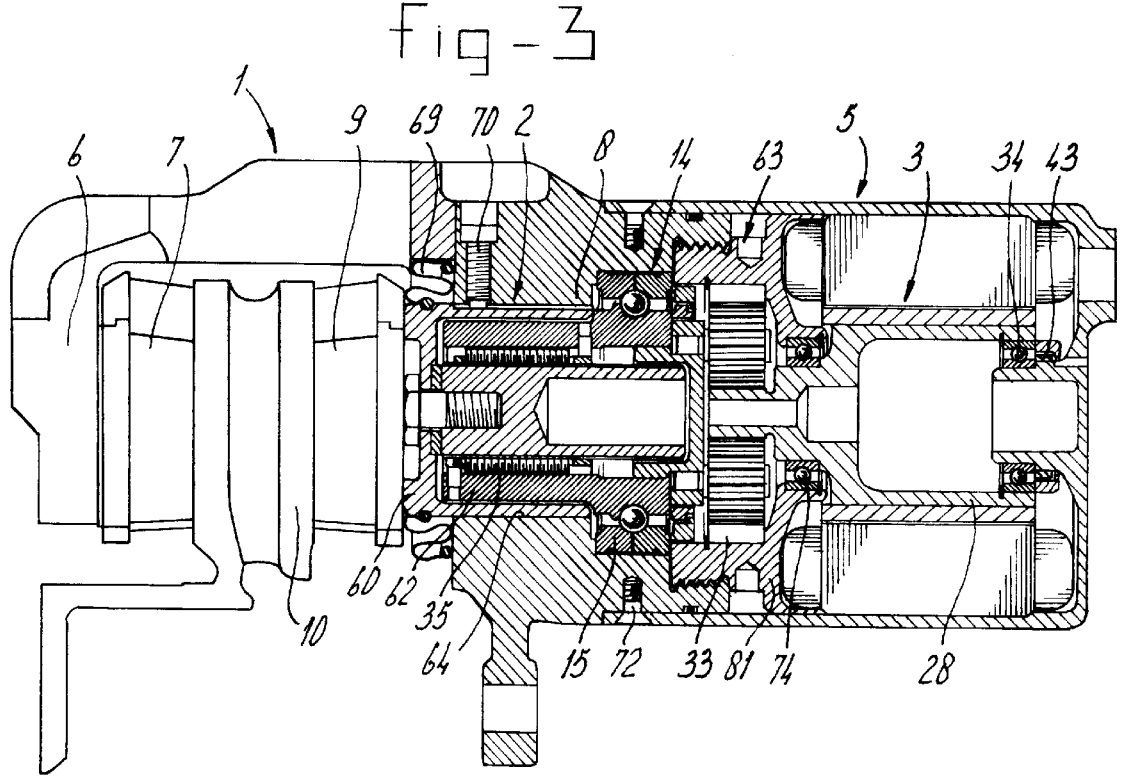
FIG. 3 shows a second embodiment of a brake calliper.

The brake calliper as shown in FIGS. 1 and 2 comprises a claw piece 1, a screw mechanism module 2, a drive module 3, a reduction gear module 63, and an electric motor 5. The claw piece 1 comprises an outer flange 6, onto which a brake pad 7 has been mounted, and an inner flange 8. Furthermore, there is another brake pad 9, as well as a brake disc 10 situated between the brake pads 7 and 9.

The modules 2, 3 and 63 or sub-assemblies thereof, can be pre-assembled into a sealed and lubricated actuating unit, which can be fitted in the brake calliper by means of bolts.

The drive module 3 is at the end of the reduction gear module 63 facing away from the screw mechanism module 2. The actuating member is in the shape of a piston 60 which is accommodated within the cylindrical space 64 of the screw mechanism module 2. This screw mechanism module 2 comprises a screw 61 and a nut 62 engaging each other by means of rollers 35.

The reduction gear module 63 moreover has two reduction steps. The first step comprises sun gear wheel 31, satellite gear wheel 32 and ring gear wheel 33 mounted within bushing 80.

The satellite gear wheels 32 are mounted on a carrier 24 which also carries a second sun gear wheel 65. This second sun gear wheel 65 engages satellite gear wheels 66, mounted on carrier 68. Moreover, the satellite gear wheels engage ring gear wheel 67 mounted within the bushing 80.

The carrier 68 is connected to screw 61 of the screw mechanism module 2.

The calliper according to FIGS. 1 and 2 is assembled by sliding the actuator 6 from the left hand side into the cylindrical space 64, after mounting the reduction gear module 63 from the same side.

Subsequently, the drive module 5 is mounted from the opposite side, to the claw piece 1, with interposition of sealing ring 81.

The drive module 5 is fixed by means of screw 72, which engages screw threaded holes 73 in claw piece 1.

Figure 4:
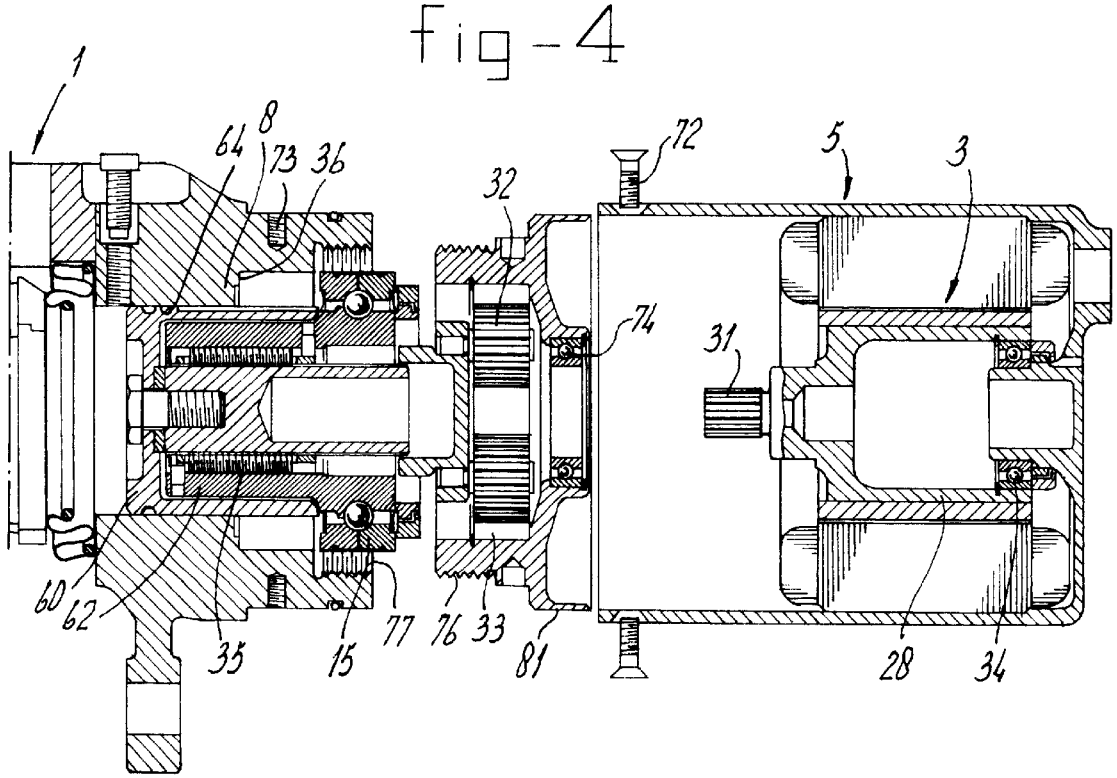
FIG. 4 shows a brake calliper according to FIG. 3 in exploded view.

The embodiment of a calliper according to FIGS. 3 and 4 largely corresponds to the calliper according to FIGS. 1 and 2. Again, the drive module 3 comprising motor 5, is at the end of the reduction gear module 63 facing away from the screw mechanism module 2.

The reduction gear module 63 comprises a partition element 81, provided with a ring gear wheel 33. The partition element 81 has an outer screw thread 76, which engages the inner screw thread 77 of claw piece 1.

By screwing the partition element 81 onto the claw piece 1, the angular contact ball bearing 14 is preloaded and held in place.

The reduction gear mechanism module 63 comprises only one reduction step, the sun gear wheel 31 being supported on the drive shaft 28 of the drive module 3.

By means of bolts 72 and screwthreaded holes 73, the drive module 3 and the claw piece 1 are held together.

What is claimed is:

1. Actuator, comprising a housing, a motor, an actuating member and a screw mechanism providing a linear movement of the actuating member with respect to the housing in response to a rotational movement of the motor, which screw mechanism comprises a screw and a nut one of the which is rotatably supported with respect to the housing by means of a bearing, and a reduction gear means, the actuating member and the reduction gear means being situated at opposite ends of the screw mechanism, the nut of the screw mechanism being rotatably supported by means of the bearing, and the screw being held against rotating, characterized in that the actuating member is a piston which is slidably held within the cylinder space of the housing, and in that the bearing is an angular contact ball bearing, the reduction gear means being contained in a reduction gear module and the screw mechanism being contained in a screw mechanism module, the screw mechanism module comprising said angular contact bearing, the outer ring of which bearing rests against an inwardly protruding flange of the housing.

2. Actuator according to claim 1, wherein the actuating member is a piston, which is slidably held within a cylinder space of the housing.

3. Actuator according to claim 1, wherein the piston is held non-rotatably by means of a groove and pin assembly.

4. Actuator according to claim 1 wherein the reduction gear module and the screw mechanism module are integrated.

5. Actuator according to claim 1, wherein the screw mechanism module and the drive module are integrated.

6. Actuator according to claim 1, wherein at least two modules are axially aligned.

7. Actuator according to claim 1, wherein at least two modules are laterally shifted or eccentric with respect to each other.

8. Actuator according to claim 7, wherein the drive module engages two laterally shifted screw mechanism modules.

9. Actuator according to claim 1, wherein the screw mechanism module comprises the angular contact bearing, the outer ring of which bearing rests against an inwardly protruding flange of the housing.

10. Actuator according to claim 9, wherein the outer ring of the angular contact bearing rests against the radial surface of the inwardly protruding flange facing away from the brake pads, said outer ring and flange being held against each other by means of bolts under tension.

11. Actuator according to claim 10, wherein the outer ring of the angular contact bearing rests against a radial surface if the inwardly protruding flange which faces towards the brake pads.

12. Actuator according to claim 1, wherein the reduction gear module comprises a nonrotatable rod or shaft which protrudes in a bore provided in the screw of the screw mechanism module, said screw and rod being connected as mutually slidable and nonrotatable.

13. Actuator according to claim 12, wherein said rod has at least a throughgoing central channel for relubricating the screw mechanism.

14. Actuator according to claim 1, wherein the reduction gear module comprises at least part of a planetary gear system having a stationary outer ring gear with inwardly pointing gear teeth.

15. Actuator according to claim 14, wherein the reduction gear module comprises satellite gear wheels which mesh with the ring gear and which are accommodated on a carrier connected to the shaft engaging the screw mechanism module.

16. Actuator according to claim 15, wherein the sun wheel of the planetary gear system is accommodated on a drive shaft of the drive module.

17. Actuator according to claim 1, wherein the angular contact bearing is a four-point angular contact ball bearing or a taper roller bearing.

18. Actuator according to claim 1, wherein a sensor is provided for detecting rotational and/or translational movements of the screw mechanism module.

19. Actuator according to claim 18, wherein control means are provided, said control means having an input for a control signal and being connected to the sensor for controlling the electric motor on the basis of the control signal and the signal from the sensor.

20. Actuator according to claim 1, wherein the screw mechanism module is a roller screw mechanism, a ball screw or a differential screw.

21. Actuator according to claim 20, wherein the rollers or balls of the screw mechanism module have a diamond-like carbon coating to maintain the proper function of the screw under dry-running conditions.

22. Actuator according to claim 1, wherein the motor is an electric motor.

23. Actuator according to claim 1, wherein the motor is a hydraulic motor.

24. Actuator according to claim 1, wherein the motor is a pneumatic motor.

25. Reduction gear module for use in the actuator according to claim 1.

26. Screw mechanism module for use in the actuator according to claim 1.

27. Drive module for use in the actuator according to claim 1.

28. Brake caliper for an electrically actuable disc brake, said caliper comprising an actuator according to claim 1, and a claw piece carrying two opposite brake pads, said actuator comprising said screw and said nut one of which is rotatably supported with respect to the housing by means of said angular contact bearing, and said reduction gear means.

* * * * *